(12) United States Patent
Chou

(10) Patent No.: US 8,533,935 B2
(45) Date of Patent: Sep. 17, 2013

(54) AUXILIARY TOOL FOR ASSEMBLING VOICE COIL MOTOR

(75) Inventor: Tzu-Nan Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/326,186

(22) Filed: Dec. 14, 2011

(65) Prior Publication Data

US 2012/0291268 A1  Nov. 22, 2012

(30) Foreign Application Priority Data

May 16, 2011  (TW) .............................. 100117121 A

(51) Int. Cl.
*G11B 5/127*  (2006.01)

(52) U.S. Cl.
USPC ................. 29/603.03; 360/294.4; 29/603.18; 29/739; 29/732

(58) Field of Classification Search
USPC ........ 29/592.1, 596–598, 605, 606, 729–732, 29/736; 360/265, 104–106, 264.2–264.9
See application file for complete search history.

(56) References Cited

U.S. PATENT DOCUMENTS

| | | | | |
|---|---|---|---|---|
| 5,347,413 | A | * | 9/1994 | Hanke et al. ............... 360/244.6 |
| 5,535,074 | A | * | 7/1996 | Leung ......................... 360/265.9 |
| 5,757,586 | A | * | 5/1998 | Budde ........................ 360/244.6 |
| 6,033,440 | A | * | 3/2000 | Schall et al. .................... 623/38 |
| 8,336,179 | B2 | * | 12/2012 | Ruden ............................ 29/283 |
| 2004/0011933 | A1 | * | 1/2004 | Miller et al. ............... 248/183.1 |
| 2005/0283971 | A1 | * | 12/2005 | Erpelding ....................... 29/605 |
| 2012/0291268 | A1 | * | 11/2012 | Chou ............................. 29/732 |

* cited by examiner

*Primary Examiner* — Minh Trinh
(74) *Attorney, Agent, or Firm* — Altis Law Group, Inc.

(57) ABSTRACT

An auxiliary tool, for assembling a number of voice coil motors, includes a number of trays, a rod member, and two limiting members. Each of the trays includes a main portion and a plurality of support arms extending away from the main portion. The main portion includes a top surface and a bottom surface. The support arms and the main portion cooperatively define two receiving spaces respectively on the top surface and the bottom surface. Each voice coil motor is received in two receiving spaces of two neighboring trays and clamped by the two neighboring trays. The rod member passes through trays and the voice coil motors. The two limiting members are sleeved over the rod member at two ends of the rod member. The trays and the voice coil motors are limited between the two limiting members.

7 Claims, 4 Drawing Sheets

AUXILIARY TOOL FOR ASSEMBLING VOICE COIL MOTOR

BACKGROUND

1. Technical Field

The present disclosure relates to voice coil motors (VCMs) and, particularly, to an auxiliary tool for assembling the VCMs.

2. Description of Related Art

Voice coil motors (VCMs) usually include a base, an actuator, a stator for receiving the actuator, two elastic plates, and a metallic shell for casing the stator and the elastic plates. When being assembled, one of the elastic plates is arranged on the base and pre-fixed to the base by ultraviolet adhesive. One end of the actuator is seated on the first elastic plate and then sleeved in the stator. The other elastic plate is mounted to the other end of the actuator and prefixed to the stator by ultraviolet adhesive. Then the stator is housed in the shell. After assembling, the VCM is applied with thermosetting adhesive and heated to connect the elastic plates, the base, and the stator. However, it increases cost and reduces assembling efficiency by pre-fixing the elastic plates by the ultraviolet adhesive.

Therefore, it is desirable to provide a tool, which can overcome the limitations described above.

DETAILED DESCRIPTION

Embodiments of the present disclosure will now be described in detail with reference to the drawings.

Figure 1:
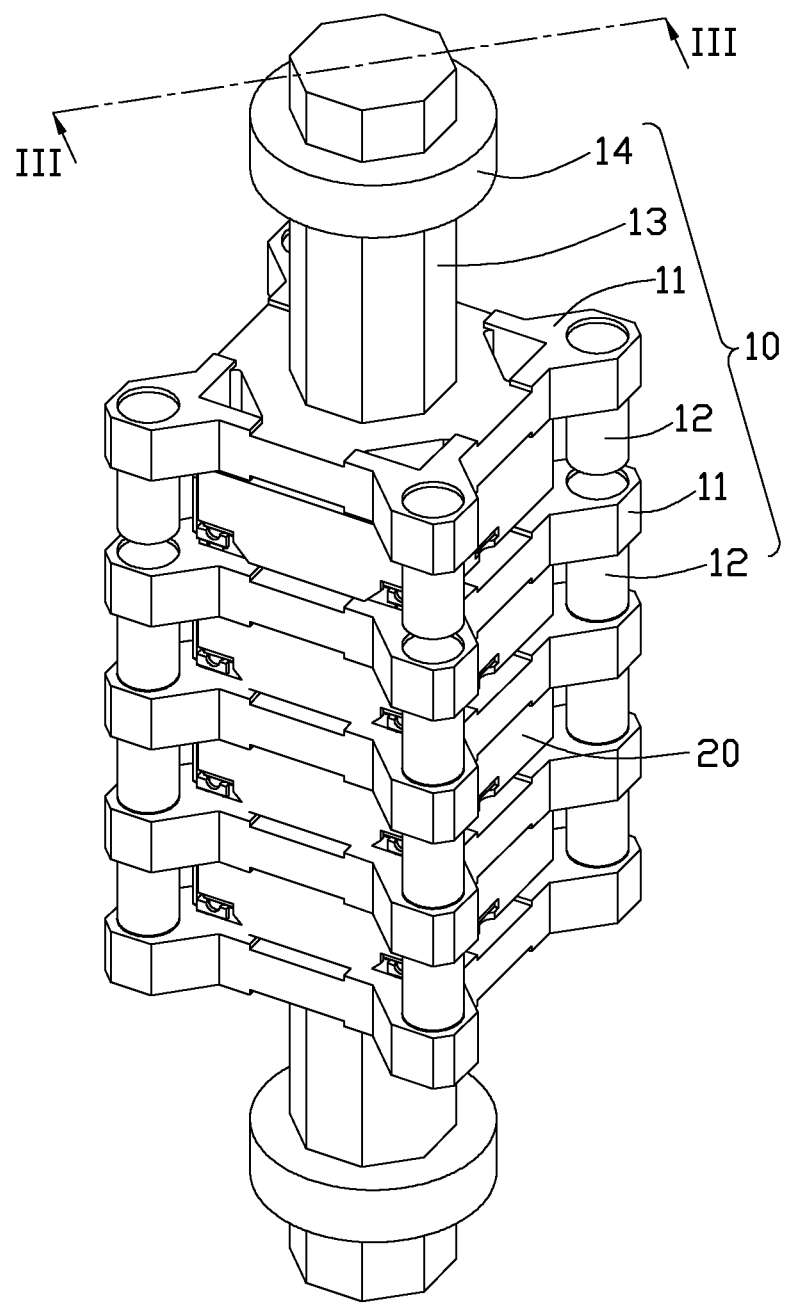
FIG. 1 is an isometric, assembled view of an auxiliary tool for assembling voice coil motors according to an exemplary embodiment.
Figure 2:
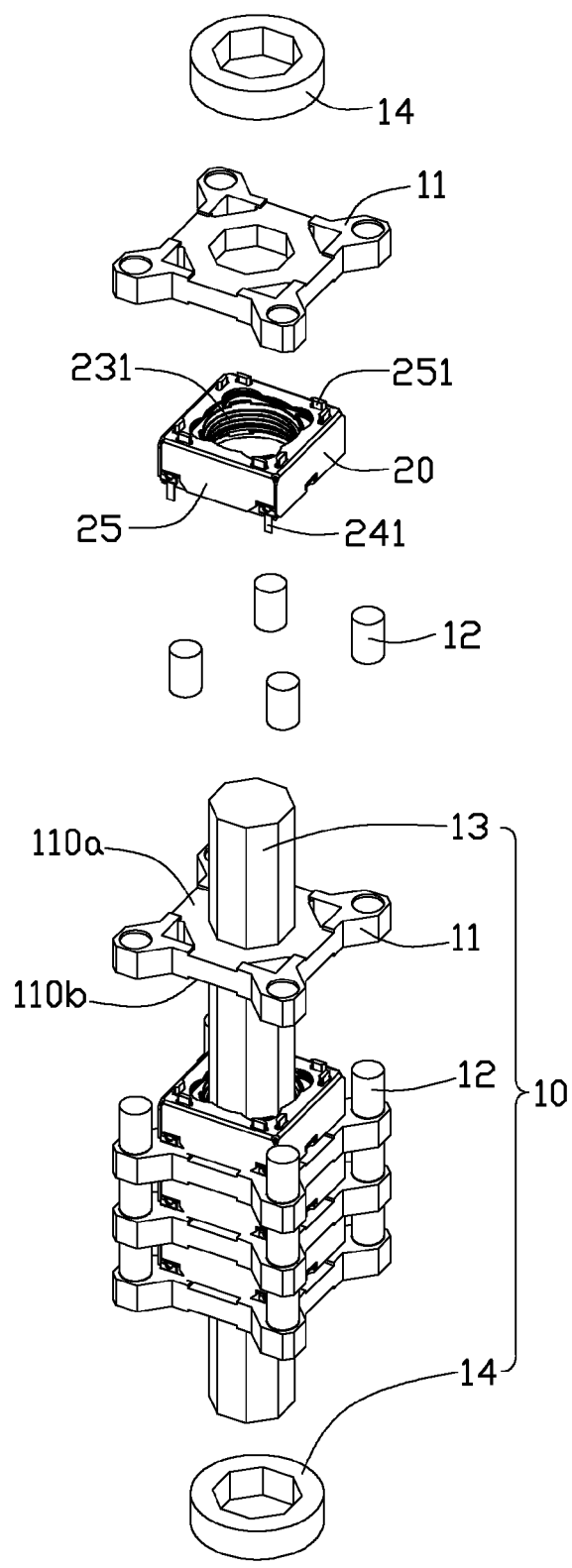
FIG. 2 is an isometric, partially assembled view of the auxiliary tool for assembling voice coil motors of FIG. 1.
Figure 3:
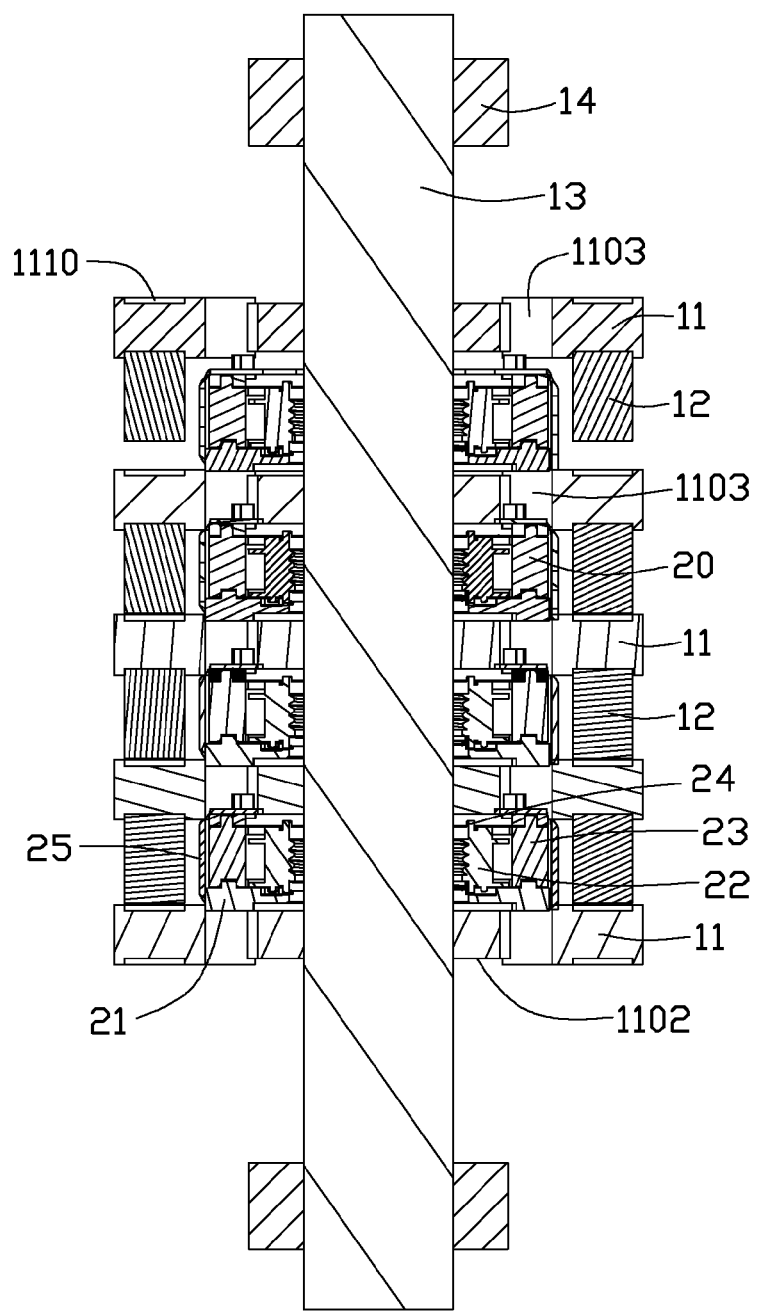
FIG. 3 is a cross-sectional view of the auxiliary tool for assembling voice coil motors of FIG. 1.

Referring to FIG. 1 to FIG. 3, an auxiliary tool 10 for assembling a number of voice coil motors (VCMs) 20, according to an exemplary embodiment, is shown.

Each of the VCMs 20 includes a base 21, an actuator 22, a stator 23, two elastic plates 24, and a metallic shell 25. The actuator 22 is tubular and defines a threaded hole 231. The threaded hole 231 can be engaged with a lens module (not shown). The elastic plates 24 include two extending electrodes 241. The shell 25 includes two end surfaces and defines a center hole passing through the end surfaces for receiving the actuator 22. The shell 25 includes a number of protrusions 251 extending up from one of the end surfaces of the metallic shell 25.

The auxiliary tool 10 includes a number of trays 11, a number of support pins 12, a rod member 13, and two limiting members 14.

Figure 4:
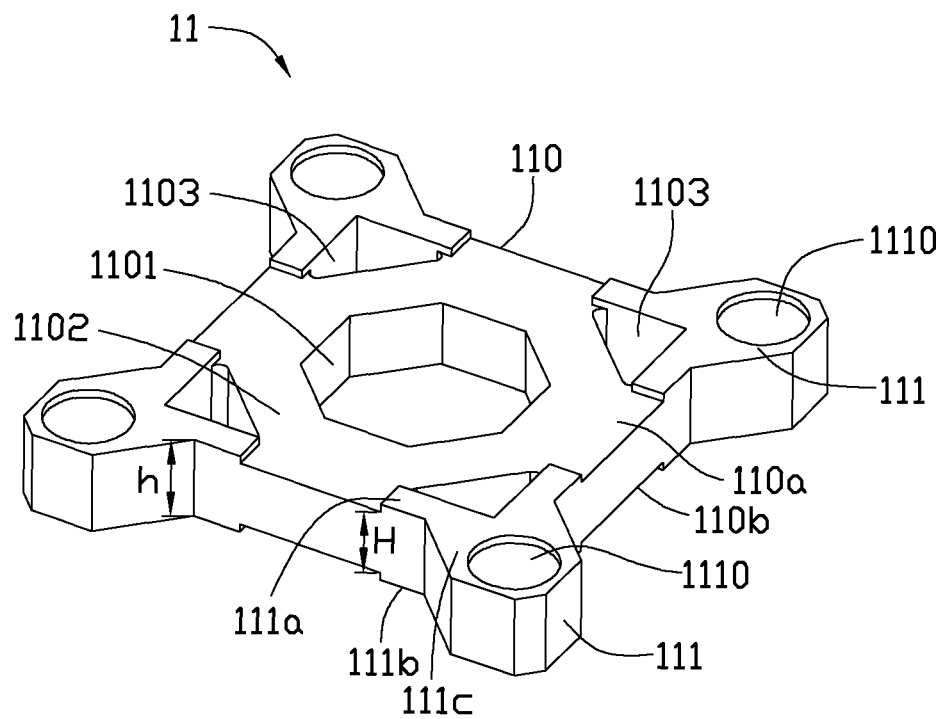
FIG. 4 is an isometric view of a tray of the auxiliary tool for assembling voice coil motors of FIG. 1.

Referring to FIG. 4, each of the trays 11 includes a main portion 110 and four support arms 111. The main portion 110 is cuboid and includes a planar top surface 110a and a planar bottom surface 110b opposite to the top surface 110a. The main portion 110 defines a through hole 1101 passing through a central portion of the top surface 110a and the bottom surface 110b. The through hole 1101 is polygonal. In this embodiment, the through hole 1101 is a regular octagon. In alternative embodiments, the through hole 1101 can be circular or squared.

The four support arms 111 extend out from four corners of the main portion 110 and are symmetrical about a central axis of the main portion 110. Each support arm 111 includes a first protruding portion 111a, a second protruding portion 111b, and an end portion 111c. The first protruding portion 111a is generally L-shaped and extends up from the top surface 110a. The second protruding portion 111b is also L-shaped and extends up from the bottom surface 110b. The end portion 111c is connected to the first protruding portion 111a and the second protruding portion 111b. The end portion 111c extends away from the main portion 110. A thickness H of the main portion 110 between the top surface 110a and the bottom surface 110b is less than a thickness h of each support arm 111 between the first protruding portion 111a and the second protruding portion 111b. Four first protruding portions 111a of the four support arms 111 and the top surface 110a cooperatively define a receiving space 1102. Four second protruding portions 111b of the four support arms 111 and the bottom surface 110b cooperatively define another receiving space 1102. The two receiving spaces 1102 are respectively on the top surface 110a and the bottom surface 110b. The end portion 111c defines two circular blind holes 1110 opposite to and coaxial with each other. The main portion 110 further defines four openings 1103 passing through the top surface 110a and the bottom surface 110b. Each opening 1103 is adjacent to a respective one of the support arms 111.

Each of the support pins 12 is cylindrical and spatially corresponds to a blind hole 1110.

The rod member 13 is spatially corresponding to the through hole 1101 and can be passed through the through hole 1101.

Each of the limiting members 14 is generally annular and can be sleeved over the rod member 13 to engage with the rod member 13.

Referring to FIG. 2 to FIG. 4, when assembling the VCMs 20, for example assembling one of a first VCM 20. One of a first tray 11 is disposed on a worktable (not shown). The base 21 is seated on the top surface 110a of the first tray 11 with the extending electrodes 241 received in the openings 1103. One of the elastic plates 24 is arranged on the base 21. Thermosetting adhesive is applied between the base 21 and the elastic plate 24 arranged on the base 21. Then, the actuator 22 is seated on the elastic plate 24 arranged on the base 21. Then the stator 23 sleeves outside the actuator 22. The other elastic plate 24 is attached on the actuator 22. Thermosetting adhesive is applied between the stator 23 and the elastic plate 24 attached on the actuator 22. Then the shell 25 is engaged with the base 21 to house the actuator 22, the stator 23, and the elastic plates 24. The first VCM 20 is partially received in one receiving space 1102 of the first tray 11. One end of each support pin 12 is received in a blind hole 1110 of the first tray 11. One of a second tray 11 is attached to the first VCM 20 with the other end of each support pin 12 received in a blind hole 1110 of the second tray 11 and the protrusions 251 received in the openings 1103 of the second tray 11. Four support pins 12 are mounted between the first and the second trays 11. The first VCM 20 is also partially received in one receiving space 1102 of the second tray 11 neighbored to the first tray. The first VCM 20 is clamped by two neighboring trays 11, namely, by the first and the second trays 11. The four support pins 12 mounted between the first and the second trays 11 to make the second tray 11 attach on the first VCM 20 to prevent the second tray 11 from pressing and damaging the first VCM 20 and further to allow the second tray 11 correctly and quickly to align with first tray 11. The assembling procedures of other VCMs 20 are similar to the first VCM 20. When all the VCMs 20 have been assembled, each VCM 20 is clamped by two neighboring trays 11. The rod member 13 passes through the threaded hole 231 of each VCM 20 and passes the through hole 1101 of each tray 11. The limiting members 14 are respectively sleeved over two ends of the rod member 13 and attached on two outmost trays 11. Therefore, all of the trays 11 and the VCMs 20 are steadily limited between the limiting members 14.

After assembling, the auxiliary tool 10 loaded with the VCMs 20 is placed in an oven and heated under a determined temperature such that the base 21 and one of the elastic plates 24 of each VCM 20 are steadily connected with each other by the thermosetting adhesive. The stator 23 and the other elastic plate 24 of each VCM 20 are steadily connected with each other by the thermosetting adhesive.

In alternative embodiment, the auxiliary tool 10 does not include the support pins 12 when each VCM 20 has sufficient strength to avoid being damaged.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An auxiliary tool for assembling a number of voice coil motors, comprising:
   a number of trays, each of the trays comprising a main portion and a plurality of support arms extending from the main portion, the main portion comprising a top surface and a bottom surface opposite to the top surface; the support arms and the main portion cooperatively defining two receiving spaces respectively on the top surface and the bottom surface, each voice coil motor being received in two receiving spaces of two neighboring trays and clamped by the two neighboring trays when the voice coil motors being assembled;
   a rod member passing through the trays; and
   two limiting members sleeved over the rod member at two ends of the rod member, the trays being limited between the two limiting members.

2. The auxiliary tool of claim 1, further comprising a plurality of support pins mounted between each two neighboring trays.

3. The auxiliary tool of claim 2, wherein each support arm defines a pair of blind holes in two opposite surfaces thereof, two ends of each of the support pins are received in two blind holes of two neighboring trays.

4. The auxiliary tool of claim 1, wherein the main portion defines a through hole passing through the top surface and the bottom surface, the rod member passes through the through hole.

5. The auxiliary tool of claim 1, wherein the main portion is cuboid, each tray comprises four support arms extending from four corners of the main portion and are symmetrical about a central axis of the main portion; each of the support arms comprises a first protruding portion, a second protruding portion, and an end portion; the first protruding portion and the second protruding portion are both L-shaped and respectively extends from the top surface and the bottom surface; the end portion is connected to the first protruding portion and the second protruding portion and extends away from the main portion; four first protruding portions of the four support arms and the top surface cooperatively define one of the receiving spaces; four second protruding portions of the four support arms and the bottom surface cooperatively define the other receiving space.

6. The auxiliary tool of claim 5, wherein a thickness of the main portion between the top surface and the bottom surface is less than a thickness of each support arm between the first protruding portion and the second protruding portion.

7. The auxiliary tool of claim 5, wherein the main portion further defines four openings passing through the top surface and the bottom surface; each opening is adjacent to a respective one of the support arms.

* * * * *